(12) United States Patent
Van Esch

(10) Patent No.: US 7,747,410 B2
(45) Date of Patent: Jun. 29, 2010

(54) DOOR MEASUREMENT SYSTEM AND METHOD

(76) Inventor: Tom Van Esch, 5039 Durnham Dr., Waterford, MI (US) 48327

( * ) Notice: Subject to any disclaimer, the term of this patent is extended or adjusted under 35 U.S.C. 154(b) by 221 days.

(21) Appl. No.: 11/973,334

(22) Filed: Oct. 5, 2007

(65) Prior Publication Data
US 2008/0106397 A1  May 8, 2008

Related U.S. Application Data

(60) Provisional application No. 60/849,675, filed on Oct. 5, 2006.

(51) Int. Cl.
G01C 9/00 (2006.01)
(52) U.S. Cl. ....................... 702/150; 342/118
(58) Field of Classification Search ......... 702/150–155, 702/182–185, 188; 701/1, 29, 49
See application file for complete search history.

(56) References Cited

U.S. PATENT DOCUMENTS 5,757,156 A * 5/1998 Sasajima .................... 318/456
2004/0189046 A1* 9/2004 Kawanobe et al. .......... 296/155

* cited by examiner

Primary Examiner—Edward Raymond
(74) Attorney, Agent, or Firm—John R. Benefiel

(57) ABSTRACT

A measurement system and method to determine the operating characteristics of a door closure sensor technology and others. The objective of the device is to obtain in a simple manipulation, accurate, high speed data. Among the identified metrics are elements such as speed, three dimensional position, hinge orientation, cabin pressure, sound quality, inertia, work, input energy and others. Another part elaborates the methodology for data acquisition and analysis to obtain reliable results reducing user dependency.

19 Claims, 15 Drawing Sheets

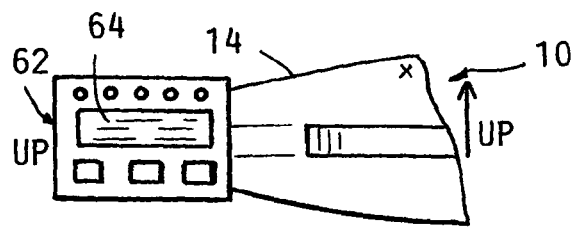
FIG. 7A
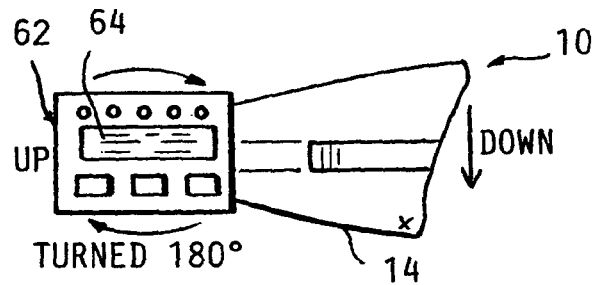
FIG. 7B
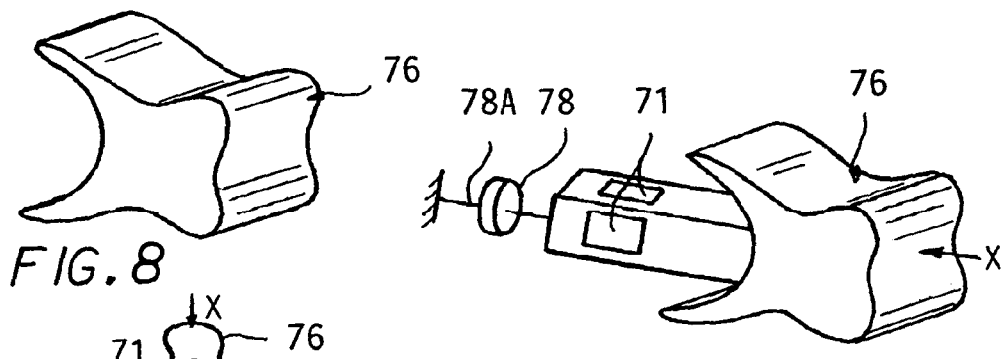
FIG. 8
FIG. 9A
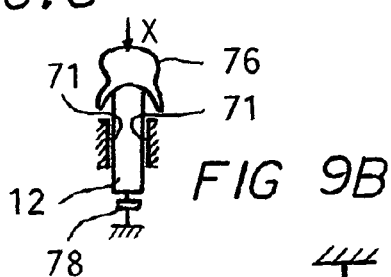
FIG 9B
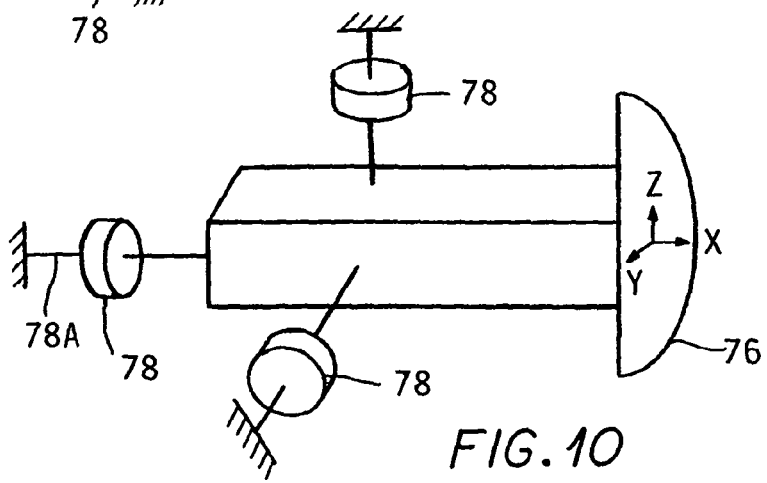
FIG. 10

I MOTION OF DOORPANEL
II MOTION OF LIGHTSOURCE
   (~ I)
III MOTION OF LIGHTSPOT ON CAMERA SENSOR
   (~ II ~ I)

DOOR MEASUREMENT SYSTEM AND METHOD

CROSS REFERENCE TO RELATED APPLICATIONS

This application claims the benefit of U.S. provisional patent application Ser. No. 60/849,675, filed on Oct. 5, 2006.

BACKGROUND OF THE INVENTION

The present invention relates in general to a measurement device and more particularly to a device for determining the operating characteristics of a door closure mechanism.

A person shopping for an automotive vehicle typically manipulates the door of the vehicle prior to sitting in the vehicle. As a consequence the operating characteristics of doors play an important role in the customer's perception, conscious or unconscious, of the quality of the product.

Equipment has heretofore been proposed to attempt to measure and quantify these characteristics, but this equipment does not quantify these characteristics comprehensively and typically involves separate testing which is time consuming and is otherwise slow, inconvenient, inaccurate and incomplete.

It is the object of the present invention to provide a system which can quickly provide comprehensive data on door operating characteristics with a simplified procedure.

SUMMARY OF THE INVENTION

The present invention provides a measurement system for quickly and reliably determining certain key metrics that quantify the quality of the kinematics of a moving part, such as a door of an automotive vehicle. This allows a manufacturer, supplier, or dealer, to quantify a quality, monitor a production run or process, compare different designs, compare the performance of competing products, as well as perform other qualitative analyses.

The system of the present invention is capable of acquiring, in a simple manner, a wide range of different parameters in a single test. Advantages may include, but are not limited to, reducing testing time and increasing the accuracy of the metrological results. A typical test using prior technology may last a day, while the present invention may reduce that time to a matter of minutes.

The system is compatible with rotational as well as sliding parts, such as pivoting doors, hoods, tailgates, sliding doors, and the like.

The measurement system according to the present invention includes a data acquisition device controlling data sampling and analog to digital conversion of data generated by a plurality of sensors included in said system, sensing a plurality of parameters and generating corresponding data; a control enabling interaction between a user and said data acquisition device; a data processor analyzing said data generated by said sensors; a memory storing device for storing data generated by said sensors before and after processing by said data processor; at least a part of said system able to be temporarily attached to said closure; said plurality of sensors including a displacement sensor sensing displacement of said closure along at least two axes and generating corresponding data, a load cell sensing the force applied by the user to the closure and generating corresponding data; and at least two accelerometers sensing accelerations of said closure and generating corresponding data.

The displacement sensors may comprise high speed linear cameras each camera having a light sensitive surface aligned with an axis, in a respective line light which projects a line of light across a light sensitive surface of the camera. The interaction of the movement of the line of light with the light sensitive surface of the associated camera is measured to determine displacement along that axis.

The system may include a thermometer sensing temperature of the environment in which said closure is disposed; an air pressure gage sensing pressure variations in a confined space closed off by said closure; one or more microphones sensing the quality of the sound produced by said closure during a closing event; a tilt sensor to determine the angle of the system with respect to the vertical. At least one of the system parts is able to be removably mounted to the closure by a vacuum cup of a vacuum system, and three supporting points form a rigid contact between the closure and the part and a vacuum is applied to said vacuum cup by a vacuum system which is electronically controlled to ensure development of a vacuum providing a force for mounting the part.

The distance from a point of rotation of a pivoted closure to each of two accelerometers is determined by the data processing from the difference between acceleration readings of two accelerometers placed at different distances from the point of rotation and also the trajectory in space of said pivoted closure is determined therefrom by the data processing.

The inertia of a pivoted closure is determined by data processing data from the accelerometers, the load cell and the distances of the accelerometers from the point of rotation of the pivoted closure.

The orientation of closure hinges pivotally mounting the pivoted closure is determined from data from the accelerometers and the determined trajectory of the pivoted closure.

The total input energy applied to the user of the closure in closing or opening the closure is determined by the data processing by the sensed trajectory and data from the load cell.

From the determination of the closure trajectory, the maximum distance the closure travels past a closed position before returning to its final closed position is determined as well as the displacement of the pivoted closure perpendicular to the direction of the main pivoting motion of the closure.

A displacement sensor senses the speed of the closure during closing and operated thereby and is compared to a speed determination from data generated by the accelerometers to calibrate the accelerometers, the displacement sensor having a greater accuracy than the accelerometers.

The closing force and work done in closing the closure is determined by the data processing based on data generated by a position sensor in combination with data from load cell.

The functional relationship between two or more sensed parameters are determined by the data processing from a limited number of data samples generated by said plurality of sensors.

The data processing determines an energy balance comprising determining the share of the total energy expended in closing the closure absorbed by each individual component of a closure assembly associated with pivoted closure in a closing event, whereby distinguishing dynamic effects from static effects can be achieved.

BRIEF DESCRIPTION OF THE DRAWINGS

The present invention will become more fully understood from the detailed description and accompanying drawings, wherein:

FIGS. 7A and 7B are front elevation views of a mechanical control box that can be rotated towards the user;

FIG. 8 is a perspective view of a push handle of the present invention;

FIG. 9A is a perspective view of a one dimensional push handle incorporating one load cell;

FIG. 9B is a plan view of the push handle shown in FIG. 9A and associated parts;

FIG. 10 is a perspective view of a three dimensional push handle incorporating three load cells;

DETAILED DESCRIPTION OF THE PREFERRED EMBODIMENTS

Figure 1A:
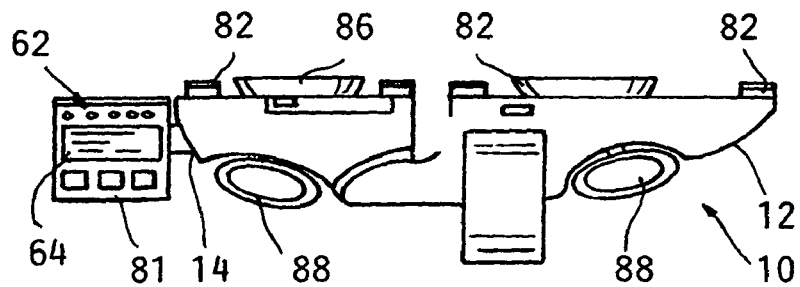
FIGS. 1A and 1B are top and side elevational views respectively of the motion unit and the master unit of the system of the present invention.
Figure 1B:
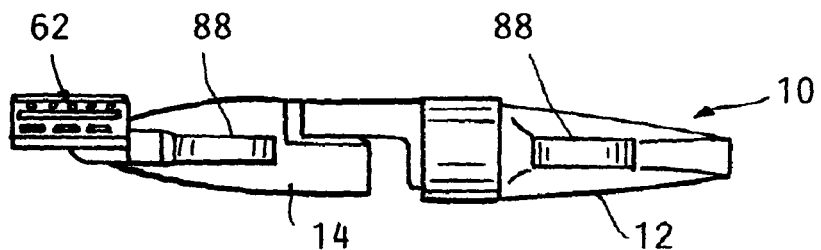
Figure 2:
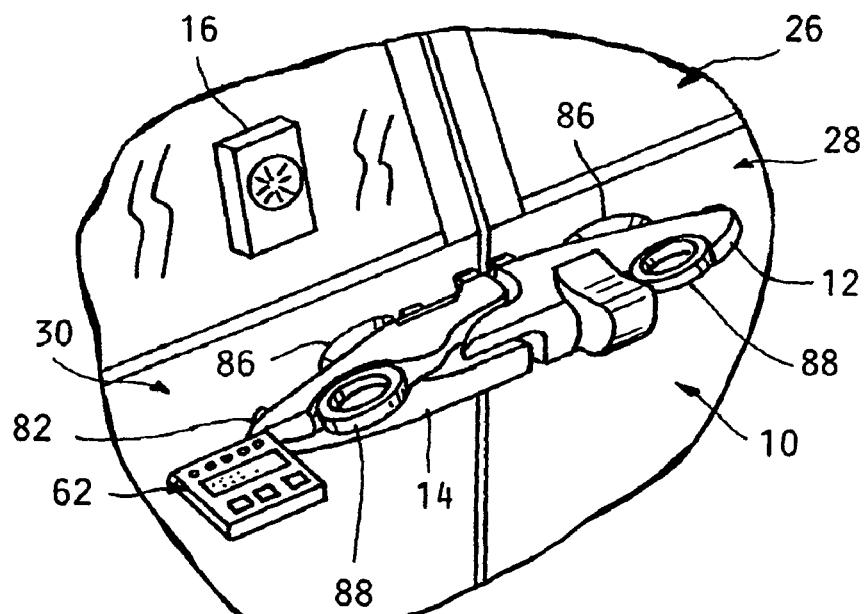
FIG. 2 is a perspective view of the master, motion and pressure units mounted on a vehicle.
Figure 3:
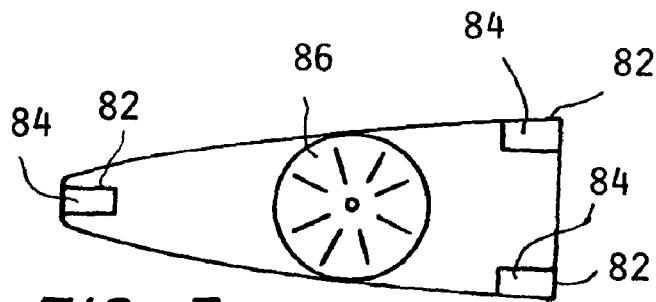
FIG. 3 is a bottom elevational view of mounting surface of the motion and master unit.

The following description of the preferred embodiments is merely exemplary in nature and is in no way intended to limit the invention, its application, or uses.

Referring to FIGS. 1A, 1B, 2, 18, and 19, a door measurement system 10 for measuring various qualitative properties of a door system, such as that found on an automotive vehicle, is shown. Door measurement system 10 may include a motion unit 12, a master unit 14, and a pressure unit 16. Each of the three units may contain various sensors or switches that can be mounted to a base plate 18 (motion unit) or a base plate 22 (master unit) of the respective unit, or alternatively, on a printed circuit board 25 housed within a body 20 (motion unit) or a body 24 (master unit) of the respective unit. An outer peripheral edge of the body engages a circumferential edge of the base plate to form an enclosure for housing the unit's various components. Door measurement system 10 is compact, lightweight, and can be easily transported by one person.

Motion unit 12 and master unit 14 can be removeably mounted in or outside of a vehicle 26. Pressure unit 16 can be removeably mounted in or connected to the interior of the vehicle. Motion unit 12 is preferably mounted on the moving part that is under investigation, such as door 28 of vehicle 26. Master unit 14 is preferably mounted immediately adjacent motion unit 12 on a non-moving part, such as a quarter panel 30 of vehicle 26.

Motion unit 12, master unit 14, and pressure unit 16, may each be equipped with a microprocessor configured to control and monitor the sensors associated with each respective unit. The microprocessors will preferably be synchronized with one another to enable the units to sample their respective sensors at substantially the same time and sampling frequency. Each microprocessor may be configured to convert, if necessary, an analog signal received from a sensor to a digital signal to minimize potential noise on the measurement data. The raw or converted data may then be communicated to one or more of the other microprocessors, as well other devices, such as a separate computer 32 (see FIG. 17) for analyzing and storing the data. Providing each unit with a separate microprocessor enables the units to operate independent of one another, such as when performing certain particularized measurements.

Figure 11:
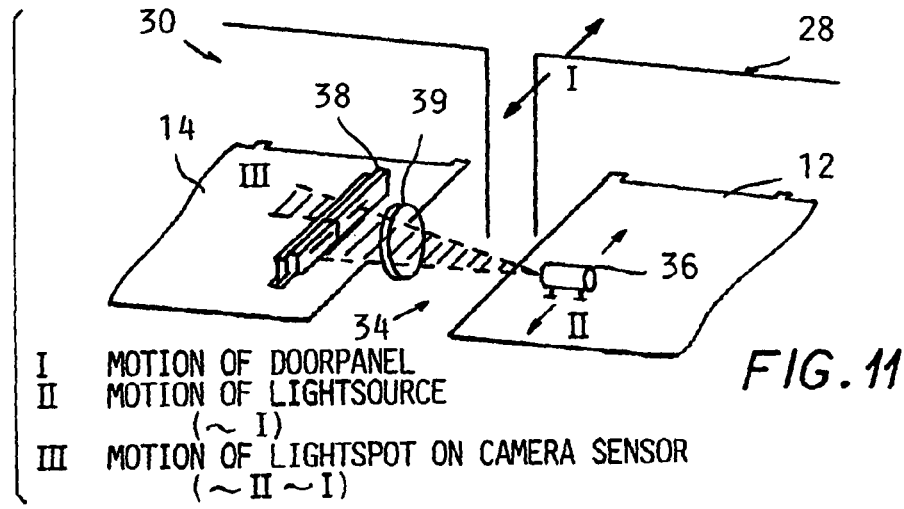
FIG. 11 is a perspective view of an optical position measurement system based on a linear camera and a line light for obtaining one dimensional measurements (only one axis)
Figure 12:
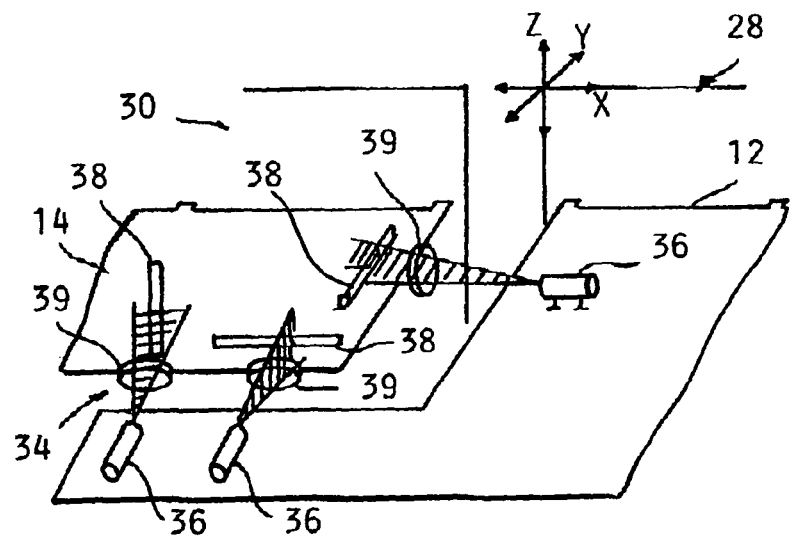
FIG. 12 is a perspective view of an optical position measurement system based on three linear cameras and three line lights for a three dimensional measurement (three axes)
Figure 13:
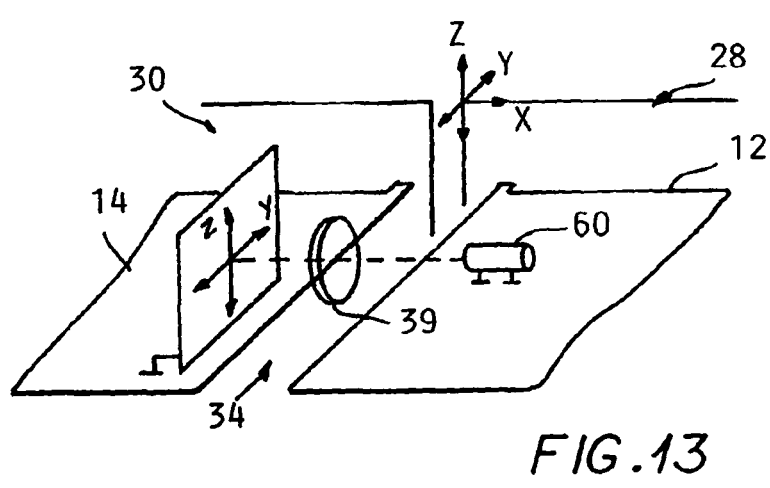
FIG. 13 is a perspective view of an optical position measurement system based on a single matrix camera and a single point light source for obtaining two dimensional measurement (two axis).

Referring also to FIGS. 11 and 12, door measurement system 10 includes a position measurement device for measuring the position of motion unit 12 relative to the master unit 14. When door measurement system 10 is mounted to vehicle 26, motion unit 12 is preferably mounted to an exterior surface of the door being inspected, and master unit 14 is mounted to a stationary panel of the vehicle adjacent motion unit 12. Movement door 28 relative body panel 30 of the vehicle can be characterized by monitoring movement of motion unit 12 relative to master unit 14. Position measurement system may be based on mechanical sensors, laser based sensors, or optical image processing.

An optical image processing system 34 for detecting and monitoring movement of door 28 may require multiple cameras to obtain three-dimensional data. The optical imaging system may include a light source 36 for generating an electromagnetic signal, mounted on motion unit 12, and a corresponding camera 38 mounted on master unit 14 for receiving the signal transmitted from light source 36. The camera can be any of known variety of optical receptors, including but not limited to a linear or matrix charge coupled device (CCD), Cmos, or position sensitive device (PSD). A known objective lens 39, or combination of lenses, can be used to adjust the field of view of camera 38, and thus its measurement range. Light source 36 may be configured to project a laser point beam, line laser beam, or LED line light.

FIG. 11 shows a linear camera 38 used in combination with an LED line light source 36. An LED line light source may allow for a larger camera mounting tolerance when compared to using a laser point beam as the light source. A laser point beam generally requires more precise alignment of the motion unit to ensure the light beam shines on the camera sensitive surface. In contrast, a line light, in which the line is perpendicular to the camera's light sensitive surface, allows the camera to be positioned anywhere along the length of the line. A single linear camera, however, is only capable of obtaining one-dimensional measurements.

Figure 34:
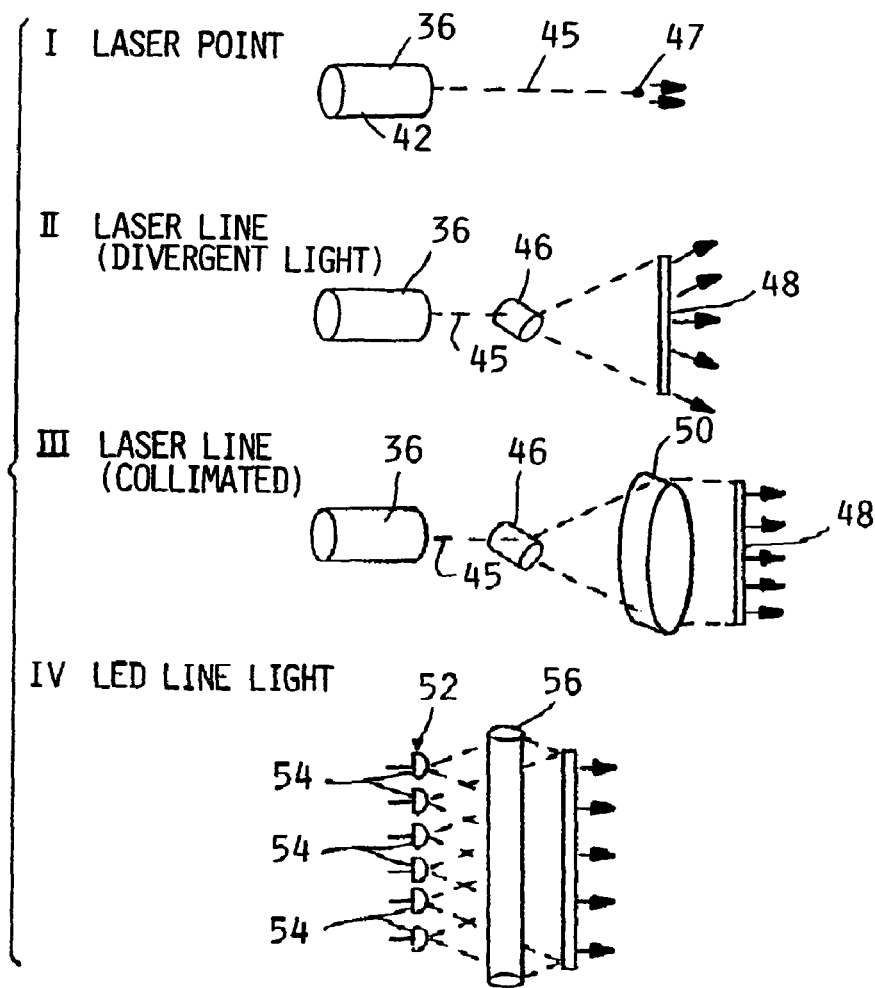
FIG. 34 is a diagram of each of several alternative light sources and their respective light bundles.
Figure 35A:
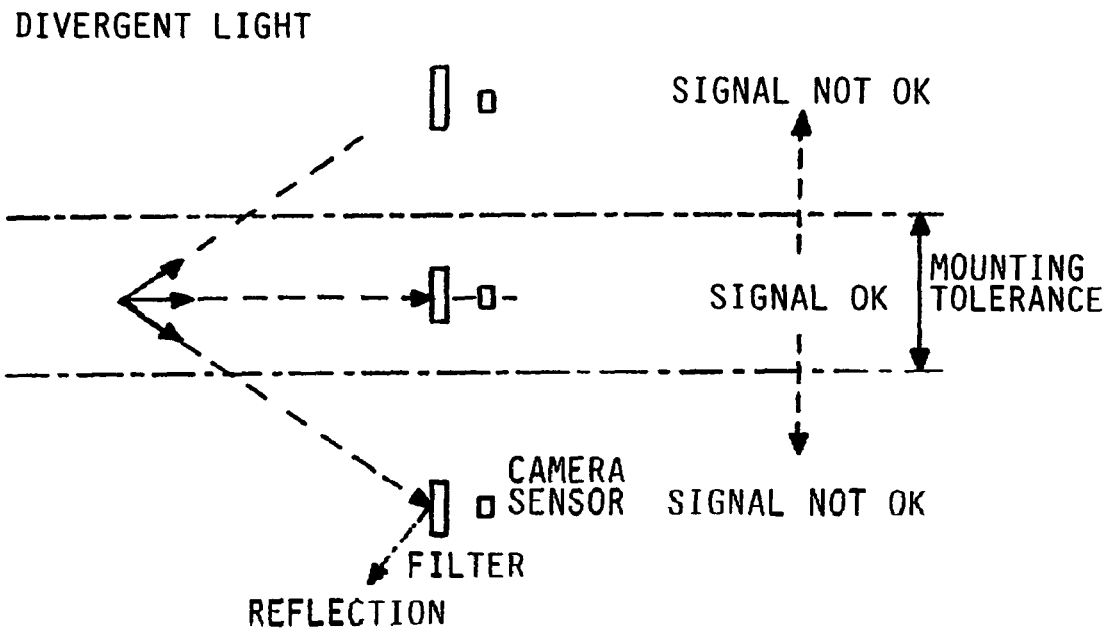
FIGS. 35A and 35 B are schematic diagrams illustrating the influence the type of light bundle has on the mounting tolerance.
Figure 35B:
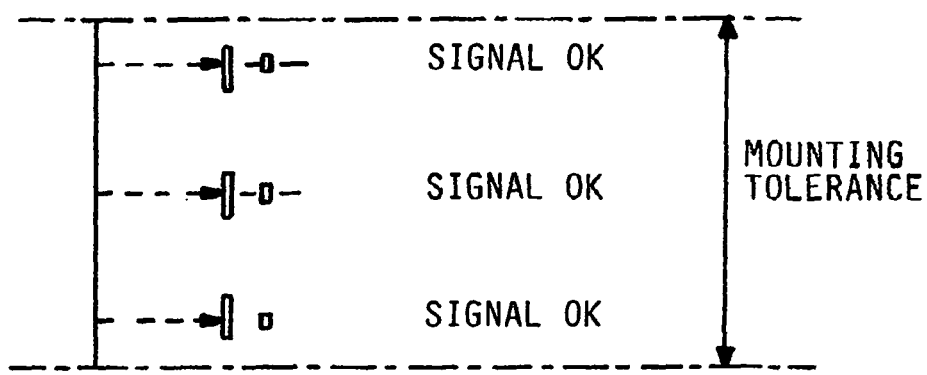

The light beam generated by the light source may have a frequency that falls within the visible red light, simple white light, or infrared frequency ranges. The light source can be a laser, light emitting diode (LED), halogen, or standard incandescent light bulb. As shown in FIGS. 34 and 35A and B, each light source is capable of producing a certain type of light bundle, such as collimated or divergent. An LED light source has an advantage of enabling increased mounting tolerances without degrading the optical performance of the light source. In contrast to an LED, a laser type light source 36 generates a light beam 45 that appears as a point 47 when projected on a surface. Passing the light beam through a cylindrical lens 46 causes the beam to appear as a line 48 when projected on a surface. This allows enlarged mounting tolerances, but may produce optical side effects, such as reflection or diffraction, when passing through optical filters and lenses. This is mainly due to the divergent light bundle. The optical anomalies may be reduced or eliminated by using various known lens assemblies 50 that are capable of creating a collimated (parallel) light bundle, but at a substantial increase in cost. A LED line light 52 is capable of.

Continuing to refer to FIG. 12, three linear cameras 38 may be used in combination to obtain three-dimensional measurements alone X, Y and Z axes. Each camera is preferably mounted at a different angle from the remaining two. Mounting all three camera substantially perpendicular to each other provides optimal performance.

Referring also to FIGS. 7A and 7B, master unit 14 may include a control box 62. Control box 62 may be a microprocessor device, or other similar device, such as a handheld computer, integrated circuit, central processing unit (CPU), or micro-controller. Control box 62 is operable for controlling data acquisition and analysis of the acquired data, including but not limited to, data acquisition setup, starting and stopping data collection, and data storage. Control box 62 may also be configured to perform initial calculations on the collected data to determine whether certain test verification parameters fall within a desired acceptable range. For example, the control box may verify if the test was performed while operating the door within a predetermined speed range, or if the force used to close the door falls within a desired range. Should one or more test verification parameter fall outside of its predetermined range, control box 62 can generate a signal that may cause, for example, a message to be displayed on a display screen 64 prompting the user for corrective action, such as conducting the test again.

Referring to FIGS. 7A, 7B, door measurement system 10 may be mounted in variety of orientations, for example upside-down, and consequently visual display 64 of control box 62 may be adjusted to enable the display to be properly viewed regardless of the orientation of door measurement system 10. This can be accomplished by pivotally mounting control box 62 to master unit 14, as shown in FIGS. 7A, 7B, thereby enabling the control box to be pivoted based on the orientation of the measurement system. Alternatively, this can be accomplished through software configured to cause the output from display 64 to be flipped depending on the orientation of the measurement system. For example, master unit 14 may include a tilt sensor 66 (see FIG. 21) for detecting the orientation of the master unit. In response to a signal received from tilt sensor 66, the microprocessor of control box 62 can cause the image displayed on display 64 to be properly oriented relative to the user. Output from tilt sensor 66 may also be communicated to the microprocessors of the other units for maintaining the proper system spatial orientation, wherein the vertical Z axis is pointing positively upwards relative to the ground.

Figure 21A:
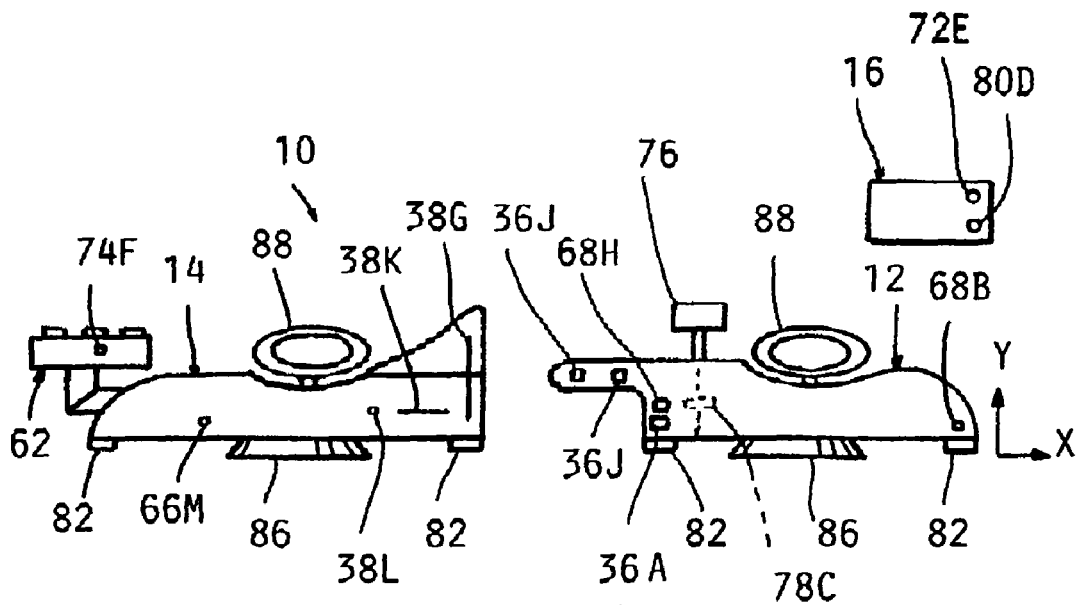
FIGS. 21A and 21B are side and top elevational views respectively of the master and motion units.
Figure 21B:
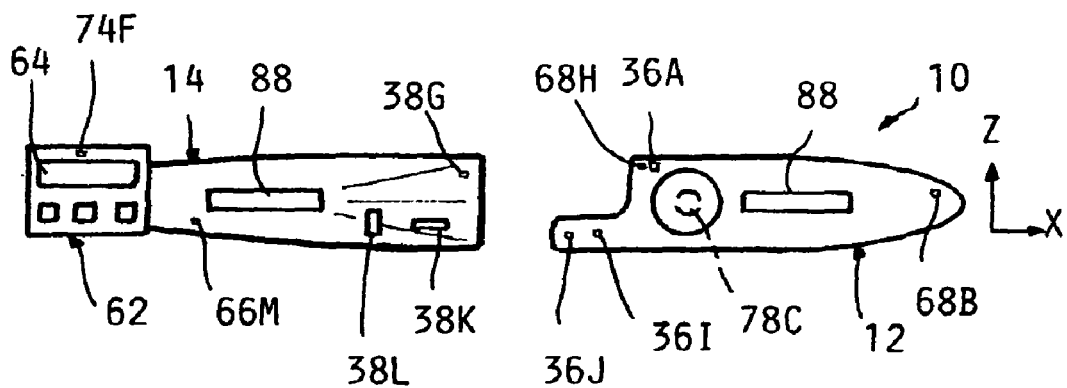

Continuing to refer to FIGS. 21A, 21B, door measurement system 10 is operable for measuring, at a minimum, the acceleration of motion unit 12 along a horizontal plane relative to the ground, by means of one or more accelerometers 68. Alternatively, the position measurement device may be utilized to determine acceleration. A wide variety of known accelerometers may be used for obtaining the acceleration measurements. The accelerometers can be mounted on the printed circuit or on the chassis of motion unit 12. A single accelerometer can measure accelerations in one, two or three dimensions. A single two dimensional accelerometer can be used to determine parameters such as acceleration, speed, and position.

When utilizing at least two accelerometers, it is preferable that the accelerometers be positioned at different locations and spaced apart a predetermined distance. This will enable the relative difference in acceleration between the accelerometers to be used to calculate the position of each accelerometer relative to an axis of rotation 70 (see FIG. 16) of door 28. This information can be used when evaluating angular motion, torque, and other operational characteristics of the door, as well quantifying the effect of various compensations.

Door measurement system 10 may also include a temperature sensor 72 for measuring the ambient temperature at which a test is being performed. Temperature sensor 72 may be mounted in motion unit 12, master unit 14, or pressure unit 16, provided the temperature at the selected location is representative of the environmental temperature. Temperature sensor 72 is preferably located away from potential heat sources, such as a power supply, light source, or other heat dissipating components.

Door measurement system 10 may also include at least one microphone 74, which can be connected to one of the microprocessors for recording sound occurring during a test. It is preferable that microphone 74 face upward away from the floor to minimize the effect of sound reflections for the floor. The microphone can be integrated into any one of the units, but is preferably integrated in rotatable control panel 62 to enable the orientation of the microphone to be adjusted independent of the orientation of master unit 88. Alternatively, microphone 74 may be a separate independent sensor that can be plugged into one of the units. A separate microphone allows a user to measure sound levels at various locations removed from the door measurement system, both outside and inside the vehicle.

Referring to FIGS. 8-10, motion unit 12 may include a separate push handle 76. Push handle 76 provides a means for grasping and manipulating the vehicle door to which motion unit 12 is attached. Push handle 76 is preferably attached to a load cell 78 for measuring the force applied to the handle. Load cell 78 detects the force being applied to the push handle 76, and thus to the door. The force applied to the push handle 76 can be one, two or three-dimensional. A one-dimensional load cell can be used for measuring simple push-pull forces. A push handle for measuring the force applied along an axis of the handle, as shown in FIGS. 9A and 9B, includes a one-dimensional load cell 78 positioned at the connection between push handle 76 and the chassis of the motion unit 12. A load cell array for detecting three-dimensional forces, as shown in FIG. 10, consists of three load cells 78 arranged with their axis aligned substantially perpendicular to one another. It is desirable that load cell 78 be located as close as practical to accelerometer 36 positioned furthest from door pivot axis 70 (see FIG. 16) when motion unit 12 is attached to the vehicle. Any difference in radius from the door pivot axis 70 will be compensated for when calculating torque based on data acquired from load cell 78 and accelerometer 36.

Figure 20:
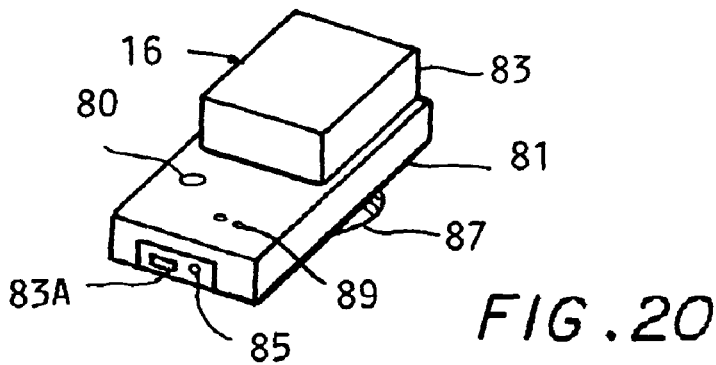
FIG. 20 is a perspective view of the pressure unit.

Continuing to refer to FIGS. 20 and 21A, 21B, pressure unit 16 may include a battery pack 83, and a pressure sensor 80, absolute or differential, for monitoring pressure variations that may occur within the passenger compartment of the vehicle during a test. A suction cup mount 87, and on-off button 83A, a cable connect 85 and LED indicator 89. Various known pressure sensors capable of producing an analog or digital output may be used. Pressure sensor 80 is capable of sending a signal indicative of the sensed pressure to an electronic signal processor enclosed within a housing 81 of pressure unit 16. It is preferable that pressure sensor 80 be positioned within pressure unit 16 to provide unobstructed contact with the air surrounding the pressure unit when the pressure unit is located within the passenger compartment of the vehicle.

Figure 17:
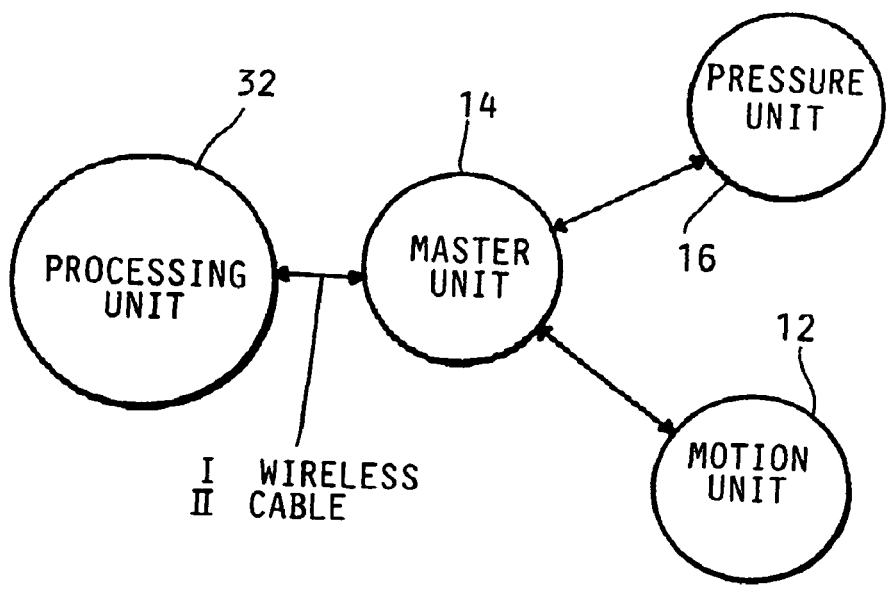
FIG. 17 is a schematic representation of the different communication channels available.
Figure 18:
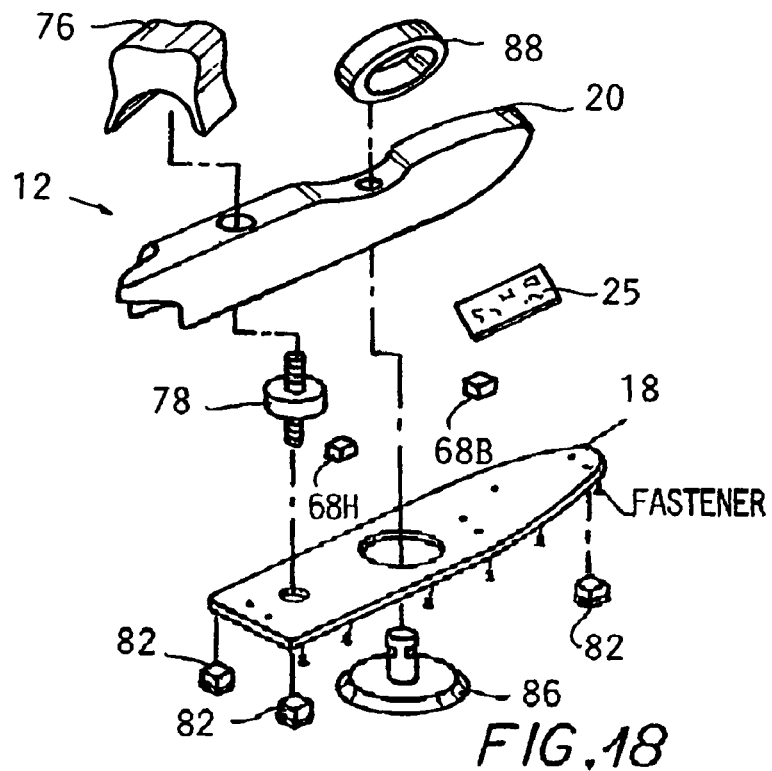
FIG. 18 is an exploded perspective view of the motion unit.
Figure 19:
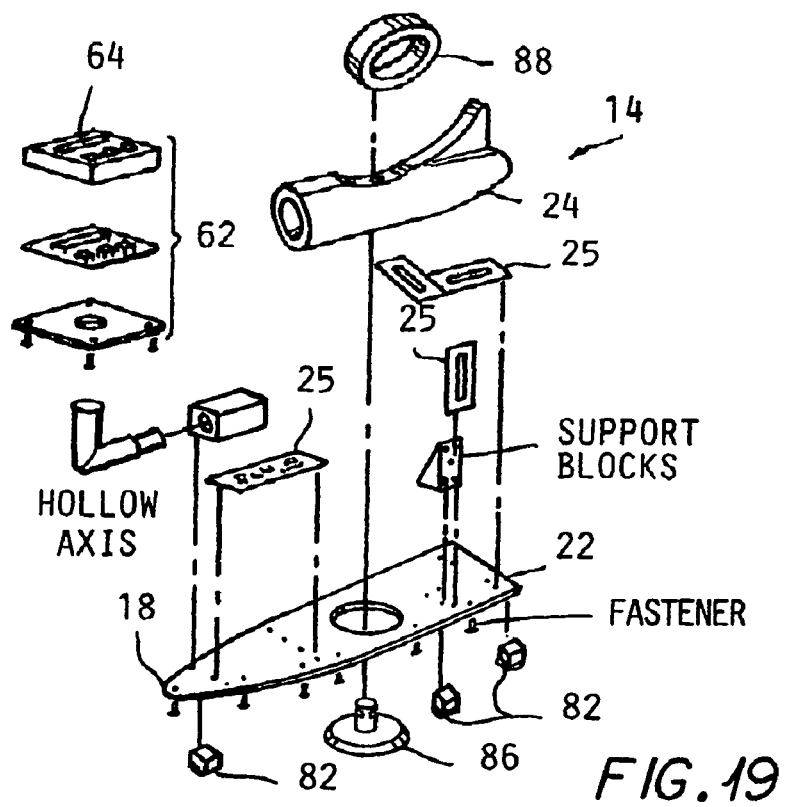
FIG. 19 is an exploded perspective view of the master unit.

Referring to FIG. 17, door measurement system 10 is capable of supporting both cable and wireless communication between the different units (master, motion, processing, and pressure unit) using various known communication protocols, including but not limited to, Ethernet, USB, serial, Bluetooth, as well as others. Each unit can have a unique address for identifying which master unit works with which motion unit and pressure unit when using wireless communication. Providing a unique address for each unit enables several systems to operate in close proximity to one another and to be connected to a single computer for collecting data from each individual unit. When operating a unit without a separate processing unit, the master unit can include an onboard memory device for storing the data. Data processing or storage using a separate database can occur later.

Motion unit 12, master unit 14, and pressure unit 16, can each be battery operated. If desired, the battery can be integrated into the unit's housing. Alternatively, each unit may be powered by a conventional external power supply.

Referring to FIGS. 3-6, the mounting side of each unit preferably includes at least three supporting faces 82 and a holding device positioned between the supporting faces to help ensure proper mounting of the unit to the vehicle. The supporting faces provide stable mounting of the unit on virtually any surface, including curved surfaces, based on a three point contact. A contact surface 84 of the supporting faces is coated with an anti-slip material to prevent slippage that could adversely affect the test results and which may cause damage to the mounting surface. It is preferable that the coating exhibit little or no flexibility when subject to the attaching load for securing the unit to the vehicle. The holding device can consist of a suction cup type mechanism 86, adhesive material, magnetic coupler, or similar detachable connecting means, capable of generating a sufficient force for securing the unit the vehicle during testing.

Figure 4A:
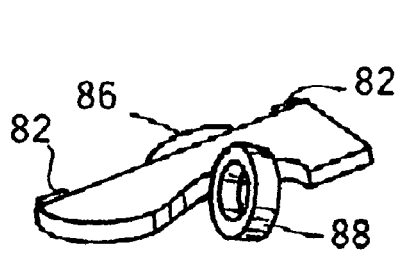
FIGS. 4A and 4B are fragmentary, perspective views of a suction cup device for attaching the master and motion units to the vehicle, with a latch handle shown in the locked and unlocked positions respectively.
Figure 4B:
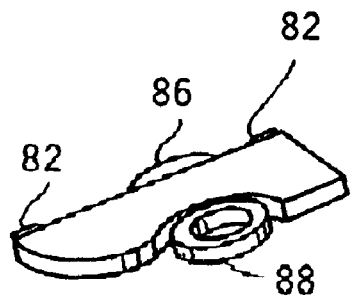
Figure 5A:
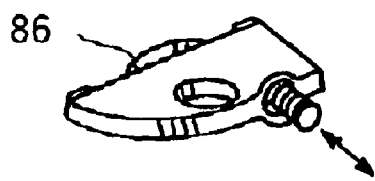
FIGS. 5A and 5B are fragmentary, perspective views of an alternate embodiment of the suction cup device utilizing a manual pump as a vacuum source for activating the suction cup device, with the suction cup device shown in the locked and unlocked positions.
Figure 5B:
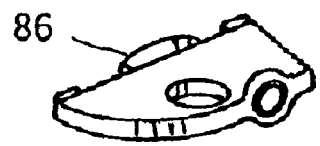
Figure 6:
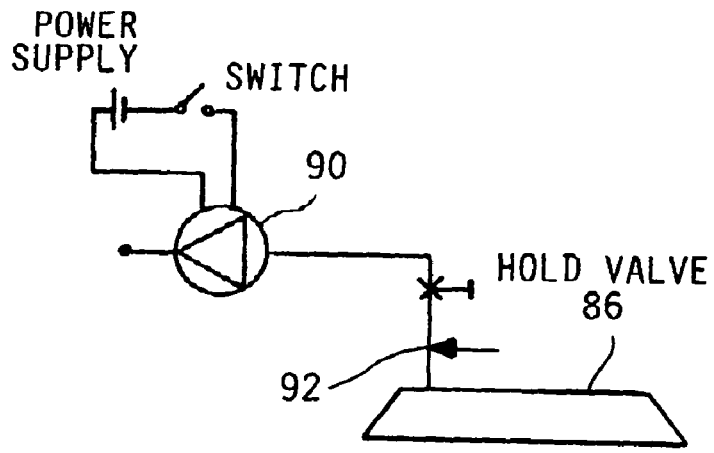
FIG. 6 is a schematic representation of a suction cup activated by an electric pump.

When using a suction cup as the holding device, the necessary vacuum can be created by various methods. For example, the suction cup 86 may incorporate an eccentric handle 88 that creates the vacuum with a single motion, such as by turning the handle 900 to a horizontal position, as depicted in FIGS. 4A, 4B. The suction cup 86 may also be activated by means of a manually operated vacuum pump, as depicted in FIGS. 5A, 5B. The vacuum in the suction cup may also be generated by means of an electrical pump 90 (see FIG. 6). An electrically operated system may have the advantage of operating more quickly and may be more convenient for frequent use than alternative vacuum systems. An electrically operated suction cup is.

Figure 14:
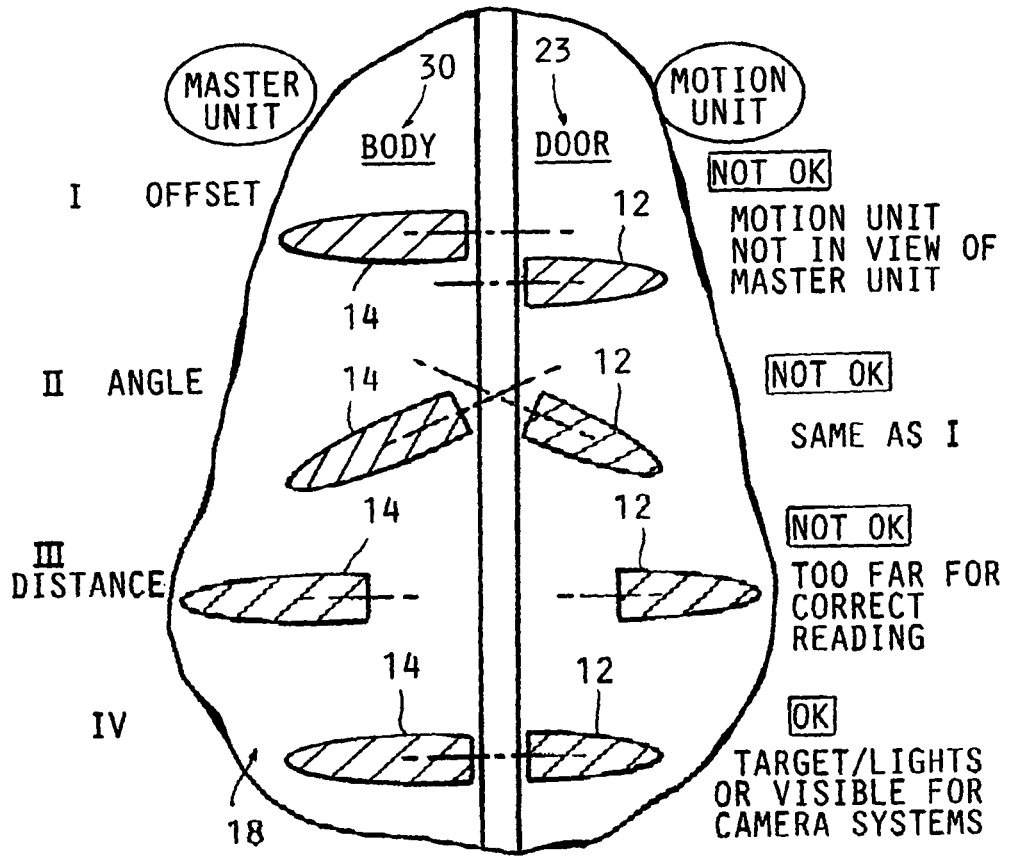
FIG. 14 illustrates alignment requirements between master and motion unit.

Using an optical system to measure the movement of the motion unit relative to the master unit requires the two units to be properly aligned to ensure that the light beam form the light source can be viewed by the corresponding camera. FIG. 14 illustrates several examples (I, II, III) in which improper alignment may prevent the camera from receiving the light beam from the source. FIG. 14(IV) shows motion unit 12 and master unit 14 properly aligned.

Figure 15:
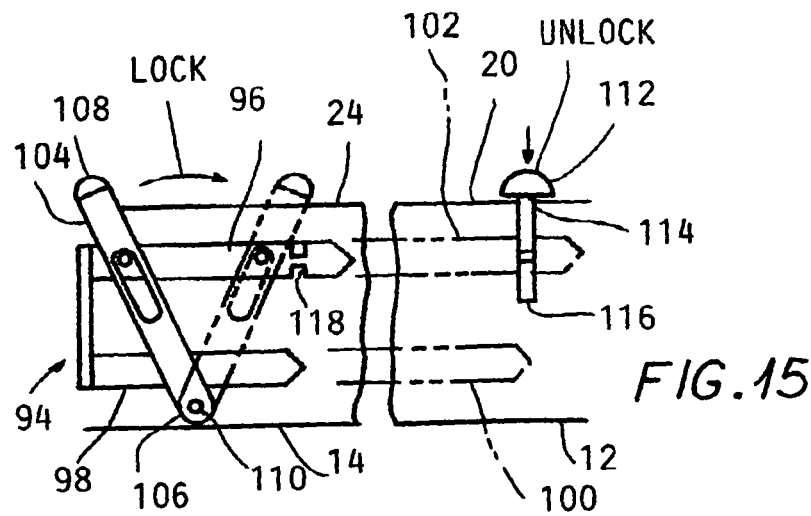
FIG. 15 is fragmentary top elevational view a mechanical alignment mechanism.
Figure 16:
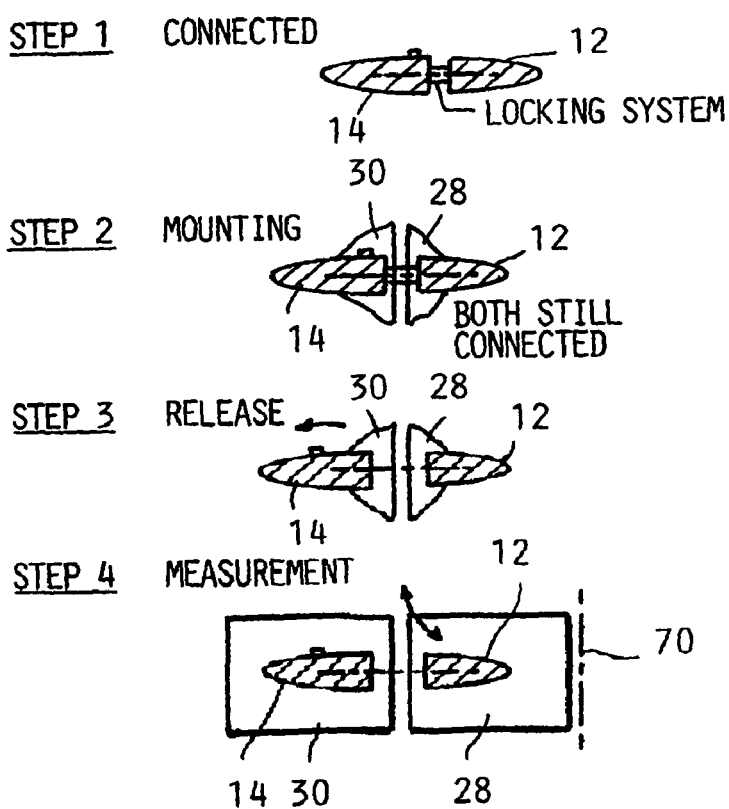
FIG. 16 illustrates the steps for mounting the present invention to a vehicle.

Referring to FIGS. 15 and 16, master unit 14 and motion unit 12 can be locked together to assist with attaching the measurement device to the vehicle and thereafter released for measurement as depicted in FIG. 12. Door measurement system 10 may include a mechanical interlock 94 to help ensure that motion unit and master unit 14 are properly aligned with respect to one another prior to conducting a test. Interlock 94 includes a pair of elongated bars 96, 98 that slideably engage a pair of corresponding elongated passages 100, 102 formed in master unit 12. A latch lever 104 for actuating the interlock has one end 106 pivotally attached to master unit 12. An opposite end 108 of the latch lever 104 passes through a slot formed in the master housing 24 and provides a handle for manually actuating the interlock between a latched and unlatched position. Latch lever 104 is rotatably attached to both pairs of bars 96, 98 by means of a pin 110, or other suitable attaching means, such as a rivet, screw, or bolt. Moving latch lever 104 to the right from the unlocked to the locked position causes locking bars 96, 98 to extend from the end of master unit 14 and engage the pair of corresponding passages formed in motion unit 12.

A locking pin 112 is provided to prevent the master unit 14 from being inadvertently detached from the motion unit 12. Locking pin 112 slideably engages an aperture in housing 20 of motion unit 12. One end 114 of the locking pin 112 slideably engages an aperture in housing 20 of motion unit 12. One end 114 of the locking pin 112 extends outward from the housing and the opposite end 116 has an aperture for receiving locking bar 96 when the interlock is positioned in the locked position. The locking pin can be engaged by manually sliding the locking pin, which causes an edge of the aperture to engage a slot 118 formed in the end of the locking bar. The locking pin 112 can be disengaged by sliding locking pin 112 in the opposite direction.

Alternatively, motion unit 12 and master unit 14 may be aligned using a visual alignment aid that can be used n conjunction with or in place of interlock system 94. The operator can determine, by observing lights or indicators, whether the maser unit and motion unit are properly aligned with respect to one another.

Location of the various sensors A-M 36A, 36I, 36J, 68B, 68N, 78E, 80D, 80E, 74F, 38K, 38L, 66M is shown in FIGS. 21A, 21B. Linear PSD sensors, as well as other photosensitive devices, can be used, such as linear CCD or matrix CCD chips. The door measurement systems can be equipped with one, two or three dimensional position measurement devices. The information that can be acquired will be limited when using one or two dimensional devices, but the information can nevertheless be used to calculate a number of parameters.

The invention can be used in many different ways. Results of the calculations can be immediately displayed on display 64, or results can be calculated after a number of acquisitions. The latter procedure can be more suited for applications where acquisition time needs to be reduced to a minimum.

The invention can be used for measuring different key metrics, each based on a different test or a combination of multiple tests. This is one of the advantages of the present invention, in which a single integrated system can combine different results from different acquisitions to calculate various operating characteristics of the door system. An operator has the option of repeating a certain test type several times to help eliminate some of the random variation that may occur between tests. Door measurement system 10 can use the data from the various tests to improve the accuracy of the calculated value. This may, for example, be the average result or the absolute maximum of all tests. All tests and respective results can be combined during calculations to create a complete profile of the door.

A slam test involves closing the door from an initially open position by applying a brief impulse force to the door. The door is in free motion and not touched by the operator at the point of closing. A slam test can be divided into a hard slam, where the door is violently closed, or soft slam, where the door is closed with a minimum force necessary to cause the door to fully latch.

A push test involves manipulating the door while grasping push handle 88 on motion unit 12. The door is gently closed by the operator by pushing until the door is fully latched. This is in general a slow motion.

A wiggle test is conducted by grasping push handle 88 on motion unit 12 and moving the door backward and forward several times in a push-pull sequence.

Door measurement system 10 is capable of performing a complete energy balance of the door system under investigation to determine how much energy is absorb by each component of the door system during a closing event. The energy distribution test involves conducting multiple tests in which different elements of the kinematics chain, such as bumpers, seals, and latches, are dismounted or disabled from the door system. The door system is considered to have a new configuration when at least one component in the kinematics chain has been modified. Separate data acquisitions are performed for each door system configuration to distinguish between dynamic behavior (typically airflow in and around seals) and semi-static effects (typically the spring effect of seals and friction loss).

An initial test configuration may consist of the door system setup in its normal state with air seals or valves in their most closed position (for example with air re-circulation on). All other doors should be closed and all seals and bumpers properly installed. This configuration will demand the most energy to fully close the door.

A second test configuration may include modifications to allow air in the vehicle passenger compartment to escape more freely than is case with the initial configuration. The second configuration can be further modified into several different alternate configurations if more detailed information concerning the escaping air is desired. This may involve modifying the position of various valves for cabin ventilation, opening various windows, and the like. The second testing configuration may conclude with all the doors in an open position to allow air present in the passenger compartment to escape with minimal resistance. This final configuration quantifies the damping effect of air trapped in the vehicle under normal circumstances.

If the door being studied contacts an adjacent door when both are in a closed position, or any of its components, such as seals, the door adjacent the door being studied can be opened, or the seals removed, as part of a subsequent test configuration. This will eliminate the counterforce generated by the seals of the adjacent door contacting the door being studied.

Additional testing configurations may include removing, one by one, interfering door components, such as primary seals, secondary seals, bumpers, and like, most of which are made of a rubber-like material. With substantially all of the interfering components removed, an additional testing configuration may also have the latch or main striker removed to enable the energy absorbed by the latching mechanism to be quantified.

Figure 36:
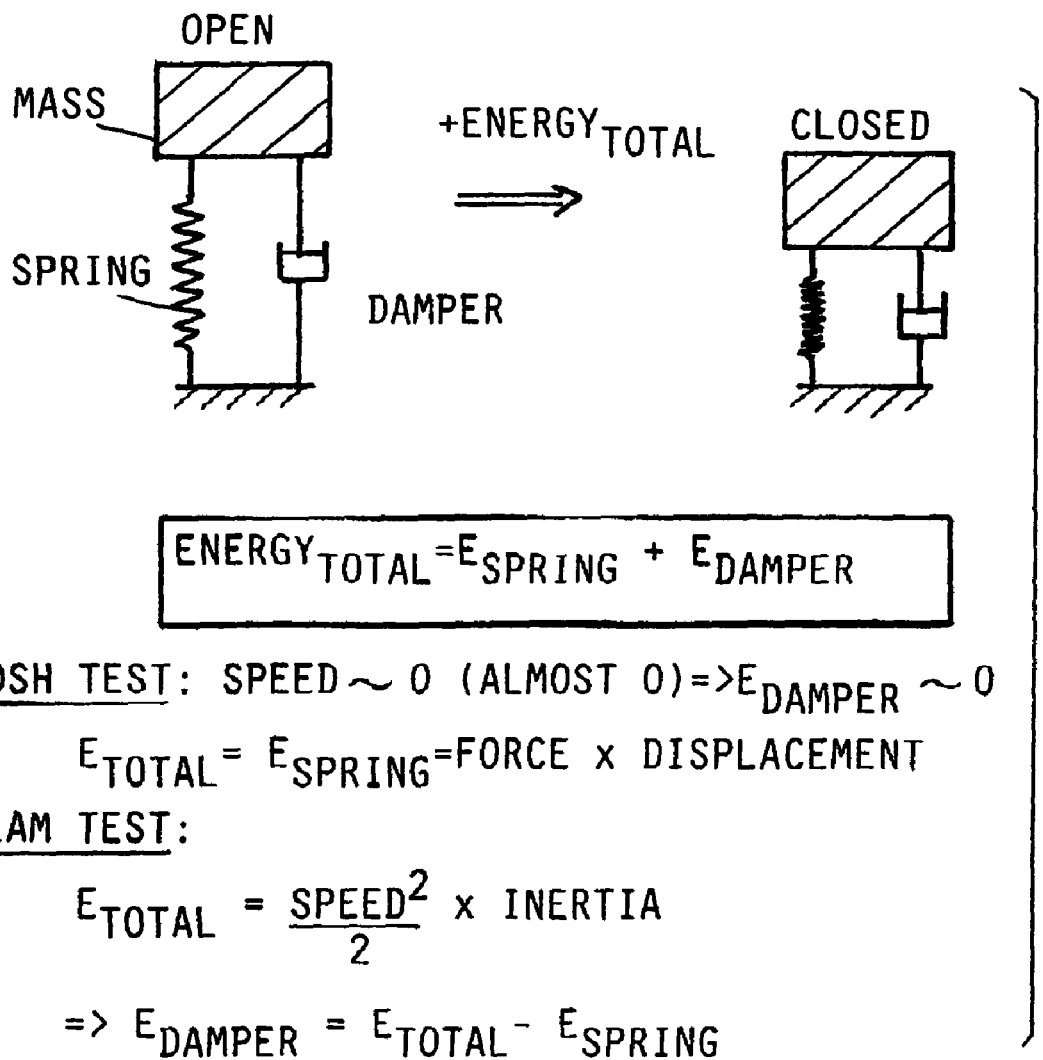
FIG. 36 is a schematic diagram of an energy balance and equations relating to the tests required for calculating the energy balance.

For each testing configuration the operator may perform one or more 'soft slam' and 'push' tests. The soft slam test will identify the minimal dynamic energy required to close the door. The push test determines the potential energy of the door system, which is a function of force and displacement. Dynamic energy is typically a function of air damping, friction, and the spring effect of seals, and is based on speed and inertia. Potential energy is a function of the elastic compression of doors seals. FIG. 36 described the steps for performing an energy balance for any given configuration.

Figure 22:
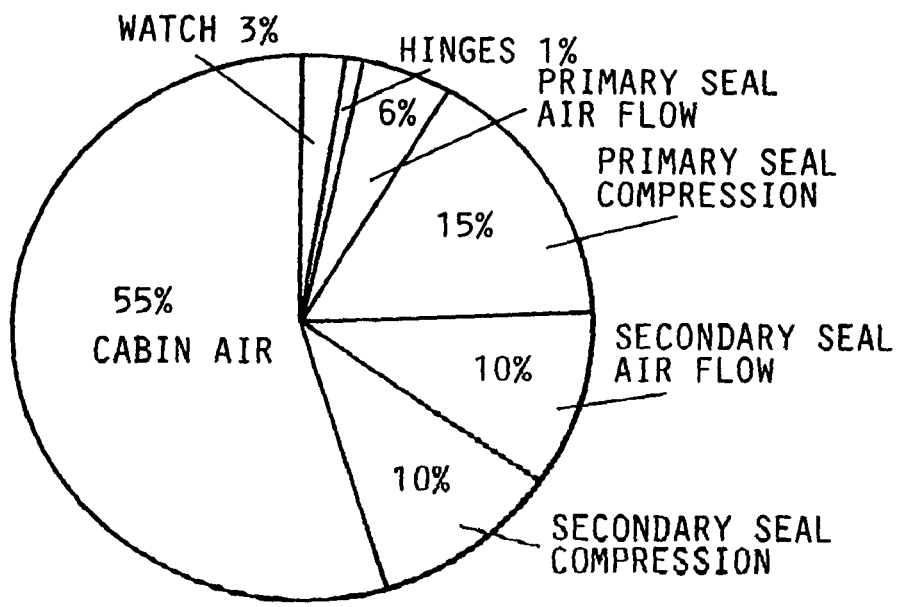
FIG. 22 illustrates an exemplary hypothetical result of an energy distribution test.

The entire testing procedure can be modified to study the effects of specific components. For example, if an individual is only interested in analyzing the effect air escaping from the passenger compartment has on the operating characteristics of the door, it would not be necessary to test all possible configurations, but rather, only those configurations that may be affected. FIG. 22 shows an example of the type of results that can be obtained from an energy distribution test.

Door measurement system 10 can be configured to allow a predetermined nominal value and an associated tolerance band to be input for each key metric measured. The measured value of the metric can then be compared against the desired nominal value to determine if the measured value falls outside the desired range and the amount by which the measured value deviates from the nominal value.

All test results can be saved in a statistical database. Various analyses can be performed on the information stored in the database to determine, for example, variations in operating characteristics between similarly and differently configured vehicles, variations in the quality of a vehicle production run, to monitor the effect modifications have on a prototype vehicle, and to quantifying the effect of aging on the operational characteristics of various door components.

The following metrics can be calculated based on data collected by the various sensors of door measurement system 10. The information collected by a particular sensor can be adjusted to account for any effect the position of the sensor relative to the door pivot axis may have on a particular measurement. The sensors may also be calibrated to ensure that their respective readings fall within the specified accuracy of the particular sensor, thereby allowing the door measurement system to be traced to a primary standard.

Figure 24:
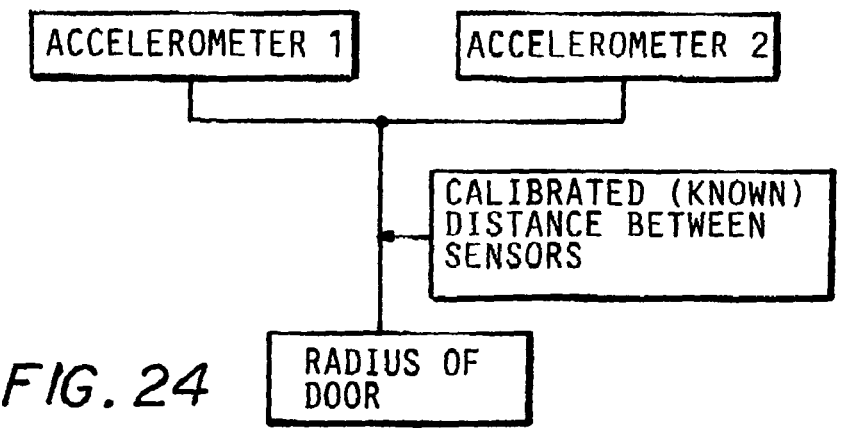
FIG. 24 is a data flowchart for calculating a radius of the door.

Door drop is a measure of the amount of vertical displacement of the end of the door opposite the door hinge, as the door is moved from an open position, just prior to engagement of the door latch, to a fully closed position, wherein the door latch is fully engaged. Door drop typically occurs during the last stage of closing the door, and may, for example, be caused by striker misalignment. FIG. 24 shows the type of sensor data required to calculate various metrics, including door drop, the speed at which the door is closed, and the amount of over slam.

Door measurement system 10 is capable of measuring the minimal speed at which the door can be closed and fully latched. This can be either the speed of the door just prior to impact, or the initial speed at which the door is moved from the open to closed position. If several tests are performed on the same door, the test with the slowest closing speed that results in the door fully latching will be considered the minimal closing speed. Results from tests in which the door did not fully latch can be used to validate the accuracy of the determined minimum latching speed, and can also provide evidence that the tests were preformed with speeds above and below the minimal latching speed. FIG. 24 illustrates the logical sequence to go from sensor to the results.

Over slam is a measure of the distance the door moves past the point at which the door 23 latch is fully latched, and is generally a result of the inertia of the door. When over slam occurs, the door will rebound to its static closed position once the elasticity of the door components overcomes the inertia of the door. Several tests performed at different speeds will enable correlation of the over slam as a function of impact speed.

Generally speaking, there are two ways of calculating over slam. One option involves calculating the maximum over slam of all the tests and reporting this as a key metric. However, because the amount of over slam is dependent on the closing speed, the measured results may vary if the closing speed is not held substantially constant throughout each test. To minimize the effect of speed, a linear or second order interpolation may optionally be used to determine a representative over slam value for a pre-determined speed. This may allow a more accurate comparison of over slam values obtain during different test runs. FIG. 34 gives an example of the type of data that may be collected and the results that can be derived from the data. FIG. 24 illustrates the logical sequence to go from sensor to the results.

The physical characteristics of some door components may vary with changes in ambient temperature. The average ambient test temperature is thus measured and logged as an environmental parameter.

Figure 27:
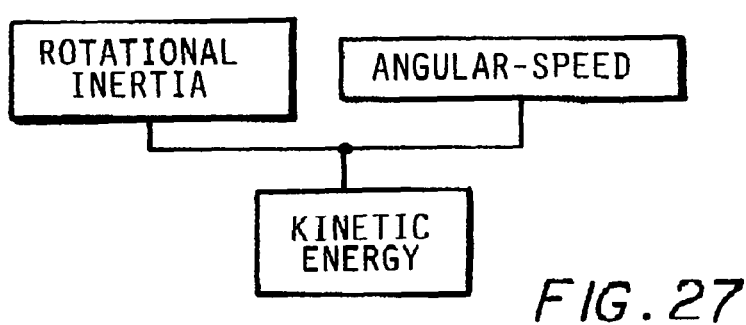
FIG. 27 is a data flowchart for calculating kinetic energy.
Figure 33:
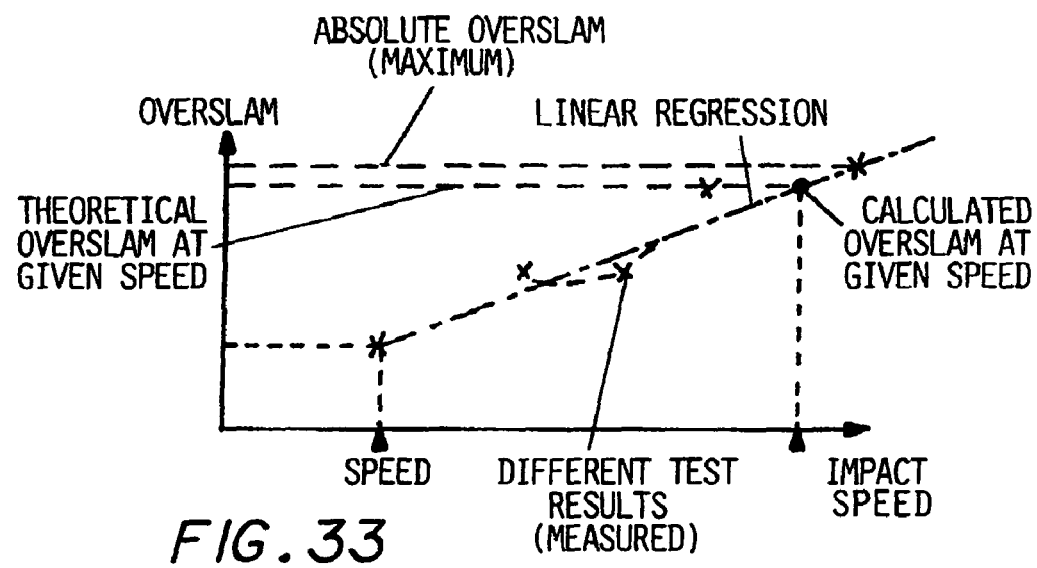
FIG. 33 is an exemplary graph depicting different results and different calculation methods used.

Closing force is the minimal closing force necessary to cause the door to latch. This test involves moving the door as slow as possible while continuously applying a closing force to the door. The closing force is measured at the point of latching. The velocity of the door is concurrently monitored to verify that the velocity has not exceeded a certain maximum speed. Knowing the speed of the door, compensation can be introduced for the inertia of the door. As shown in FIG. 33, the force measurement is combined with the position measurement to determine the magnitude of the force being applied at the moment the door becomes fully latched. Any force applied after the door becomes fully latched is not taken into account. FIG. 27 shows the logical sequence for collecting sensor data and calculating metrics from the collected data.

Figure 32:
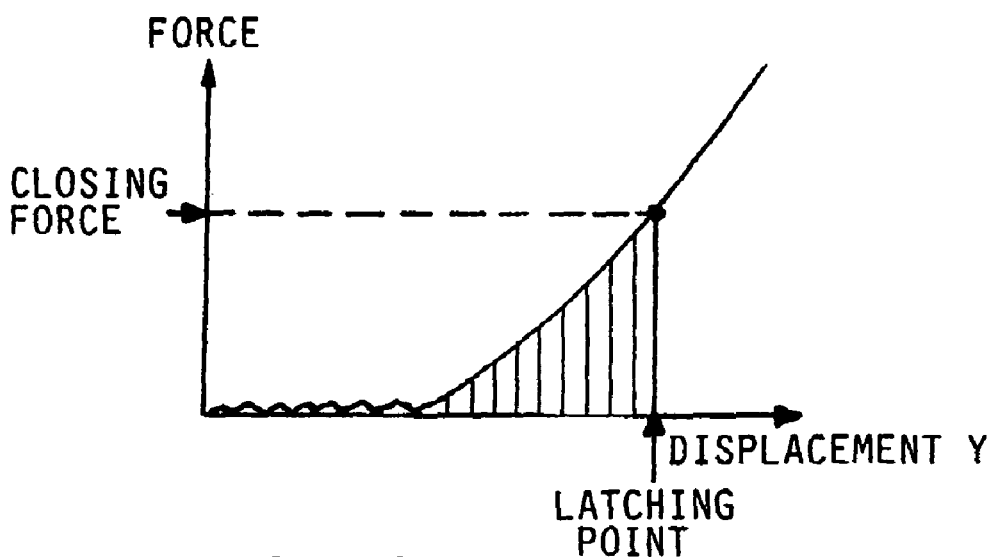
FIG. 32 is an exemplary graph depicting closing force as a function of door position.

A complete speed plot may be generated as the door is moved from the open to the closed position. The speed is correlated as a function of the door angular position. This information can be used to determine the influence different stop-points have on the final closing speed. Stop points are locations along the path of travel, as the door moves between the open and closed positions, at which the door will remain stationary without any additional force being applied to the door. FIG. 32 illustrates the logical sequence between data collection and determining results based on the collected data.

Figure 26:
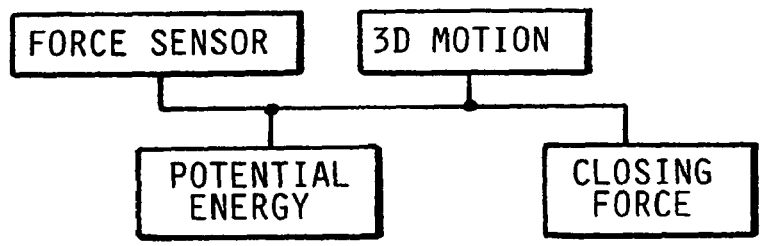
FIG. 26 is a data flowchart for calculating the potential energy of the door and a closing force.

The rotational inertia of the door is a measurable parameter. This information may be useful, for example, when analyzing the performance of a competitor's product for which the inertia is unknown. FIG. 26 illustrates the logical sequence to go from sensor to the results.

The rotational inertia and radius of the door may be used to estimate the weight of the door. This is an indicating value, especially if the system is used on closures in which the weight is unknown. FIG. 26 illustrates the logical sequence to go from sensor to the results.

Potential energy is only calculated during a push test. Potential energy may be determined from the position and force measurements. If position data is unavailable, alternative sensors, such as accelerometers, may be used. FIG. 27 illustrates the logical sequence to go from sensor to the results.

Figure 28:
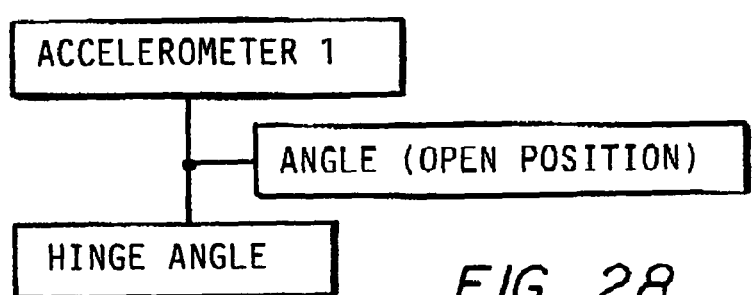
FIG. 28 is a data flowchart for calculating hinge angle.
Figure 29:
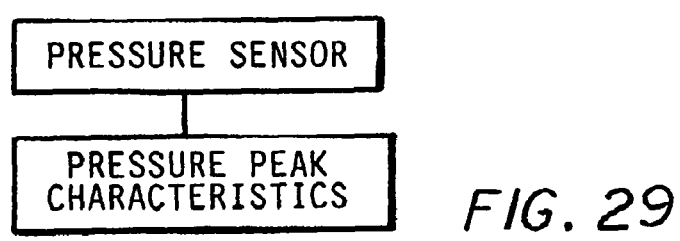
FIG. 29 is a data flowchart for calculating pressure characteristics.

Total energy may be determined by analytically combining the inertia of the door and the minimum closing speed. The inertia can either be entered, if known, or may be determined from other measurements. FIG. 28 illustrates the logical sequence to go from sensor to the results.

Kinetic energy can be determined based on the difference between the total and potential energy of the door system.

In motion force is the force applied to the door to initiate movement of the door. One component is the minimum force necessary to initiate closing of the door. The other component is the minimum force necessary to move the door to the open position.

Figure 25:
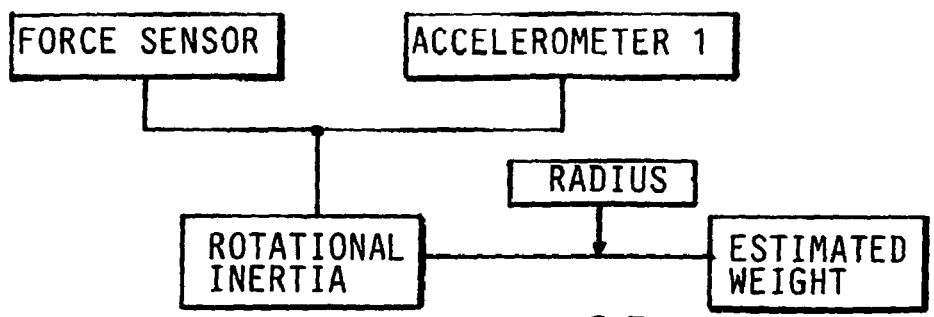
FIG. 25 is a data flowchart for calculating the inertia and estimated weight of the door.
Figure 23:
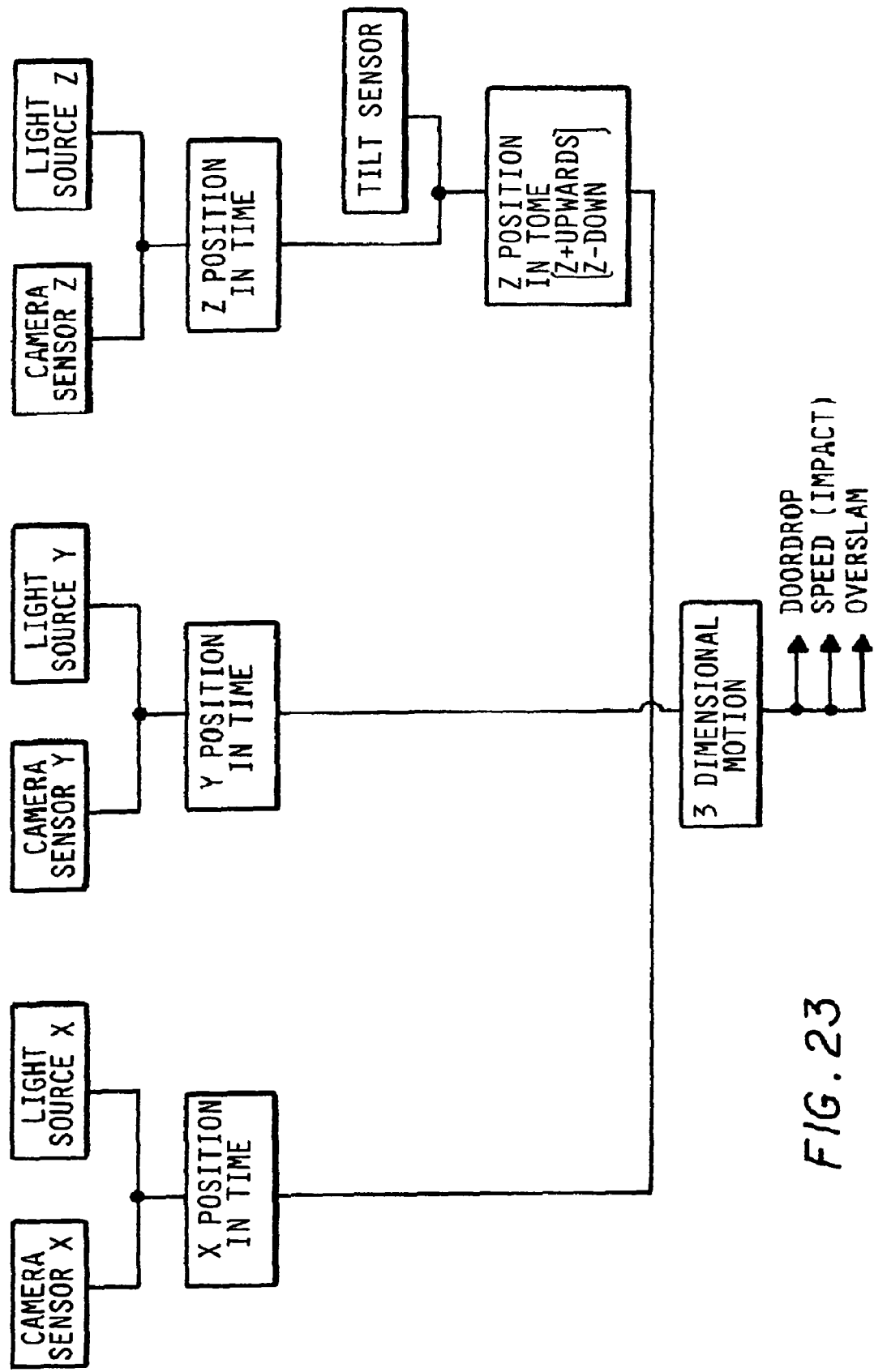
FIG. 23 is a data flowchart for calculating three-dimensional motion.
Figure 31:
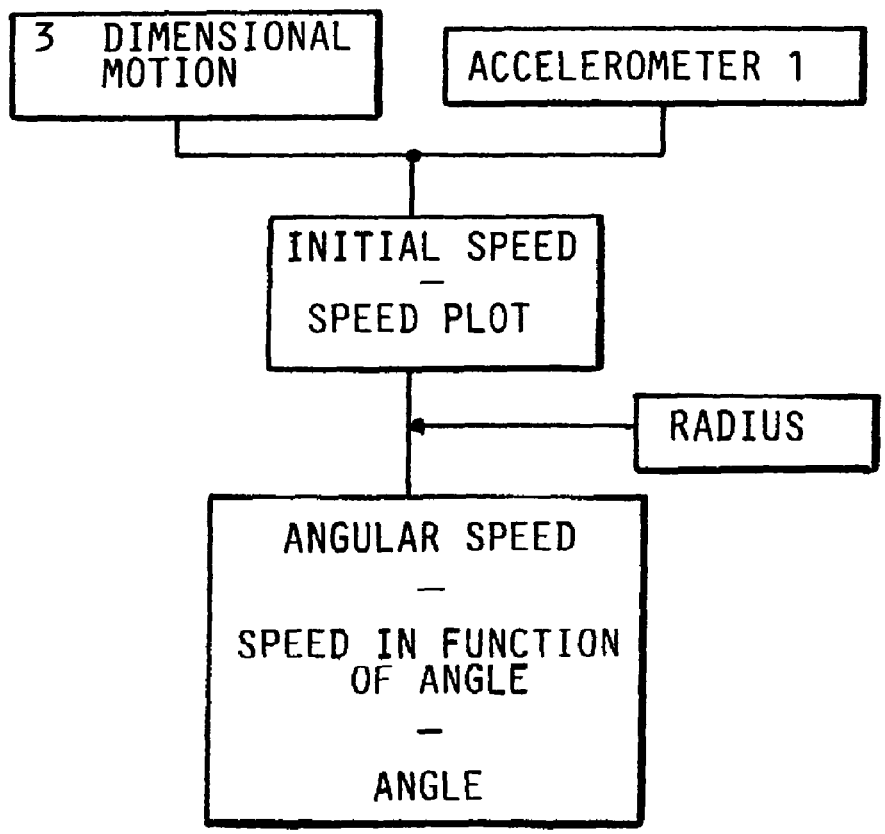
FIG. 31 is a data flowchart for calculating angular speed.

With respect to pivoting type doors, the radius of the door can be measured by any conventional distance measuring device, or can be determined based on sensor data from two accelerometers located at different distances from the pivot axis of the door. The radius can be used to convert force to torque, inertia to weight, and linear speed to angular speed. The radius may also be used to calculate, in conjunction with other sensor data, the door hinge angle and speed curve. FIG. 25 illustrates the logical sequence to go from sensor to the results Each acquisition stores the sound produced by the closing door. The recorded sound information may be transformed into a single characteristic number indicative of an individual's perception of the sound. FIG. 31 illustrates the logical sequence to go from sensor to the results.

The angle of the door pivot axis relative to the gravitational force vector is measured to determine the influence gravity has on the operation of the door. A vehicle measured under a five degree hinge angle may, for example, have a significant adverse affect on the accuracy of test results. FIG. 28 illustrates the logical sequence to go from sensor to the results.

Figure 30:
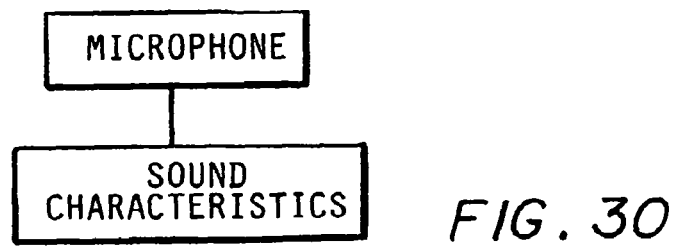
FIG. 30 is a data flowchart for calculating sound characteristics.

Pressure variations inside the vehicle cabin can be measured while closing the door. The results not only include a peak pressure value, but also the rise and drop in pressure as a function of time. FIG. 30 illustrates the logical sequence to go from sensor to the results.

A tilt sensor, accelerometer, or other orientation measurement device can be used to determine the orientation of the door measurement system when attached to the vehicle. Vertical up relative to the ground is considered by convention to be positive, and vertical downward negative. When mounting the door measurement system upside down, subsequent calculations will take into account this inversion of the vertical axis. With this method, the reading is always the same, independent of the mounting position of the measurement system.

The invention claimed is:

1. A measurement system adapted to determine key metrics of a pivoted closure during a closing event, comprising:
   a data acquisition device controlling data sampling and analog to digital conversion of data generated by a plurality of sensors included in said system sensing a plurality of parameters and generating corresponding data;
   a control selectively enabling control over operation of said data acquisition device said data processing and said memory device, and said display to include selectively stopping and starting data sampling or recording:
   a data processor receiving and analyzing said data generated by said sensors;
   a memory device storing data generated by said sensors before and after processing by said data processor;
   a display displaying data before or after said data is analyzed by said processor;
   at least a part of said system able to be temporarily attached to an exterior portion of said closure;
   said plurality of sensors including at least one displacement sensor sensing displacement of said closure along at least one axis and generating corresponding data, a load cell sensing the force applied by the user to the closure and generating corresponding data; and an accelerometer sensing accelerations of said closure and generating corresponding data.

2. A measurement system according to claim 1 wherein said displacement sensor comprises a high speed linear camera; said camera having a light sensitive surface extending along said axis; a line light mounted to said closure, said line light projecting a line of light perpendicular to a said light sensing surface of said camera;
   movement of said line of light along said light sensitive surface produced by movement of said closure.

3. A measuring system as set forth in claim 2 wherein three linear cameras and line lights are included to determine displacement of said closure along three axes.

4. A measurement system as set forth in claim 1 wherein said plurality of sensors further includes a thermometer sensing the temperature of the environment in which said closure is disposed and generating corresponding data.

5. A measurement system as set forth in claim 1 wherein said plurality of sensors further includes an air pressure gage sensing air pressure variations in a confined space closed off by said closure and generating corresponding data.

6. A measurement system as set forth in claim 1 wherein said plurality of sensors further includes one or more microphones sensing the quality of the sound produced by said closure during a closing event and generating corresponding data.

7. A measurement system as set forth in claim 1 wherein said plurality of sensors further includes a tilt sensor sensing the angle of a part of the system with respect to the vertical.

8. A measurement system as set forth in claim 1 wherein at least one part of said system is able to be removably mounted to said closure by a vacuum cup of a vacuum system, and three supporting contact points on said part forming a rigid engagement between said closure and said part.

9. A measurement system as set forth in claim 8 wherein a vacuum is applied to said vacuum cup by said vacuum system which is electronically controlled by said control to ensure development of a vacuum in said vacuum providing a sufficient force to support said part of said system.

10. A measurement system according to claim 1 wherein at least two accelerometers are included and the distance from a point of rotation of said pivoted closure to each of said accelerometers is determined by said data processor from the difference between acceleration readings of said two accelerometers which are placed at different distances from said point of rotation.

11. A measurement system according to claim 10 in which the inertia of said pivoted closure is determined by said data processing from data from said accelerometers, said load cell and said determined distances of said accelerometers from said point of rotation of said pivoted closure.

12. A measurement system according to claim 10 in which a displacement sensor senses the speed of said closure during closing and data generated therefrom is compared to a speed determination from data generated by said accelerometers by said data processor to calibrate said accelerometers, said displacement sensor having a greater accuracy in sensing speed than said accelerometers, and wherein a trajectory in space of said pivoted closure is determined from said acceleration readings of said two accelerometers by said data processor.

13. A measurement system according to claim 12 wherein the orientation of closure hinges pivotally mounting said closure is determined by said data processor from data from said accelerometers and said determined trajectory of said pivoted closure.

14. A measurement system according to claim 12 in which the total input energy applied by the user of said closure in closing or opening said closure is determined by said data processor by the sensed trajectory and data from said load cell.

15. A measurement system according to claim 12 wherein from said determination of said closure trajectory, the maximum distance the closure travels from a closed position before returning to said final closed position is determined as well as the displacement of said pivoted closure perpendicular to the direction of a main pivoting motion of said closure.

16. A measurement system according to claim 1 in which a closing force and work done in closing said closure is determined by said data processing processor based on data generated by a position sensor in combination with data from said load cell.

17. A measurement system according to claim 1 wherein a functional relationship between two or more sensed parameters are determined by said data processor from a limited number of data samples generated by said plurality of sensors.

18. A measurement system according to claim 1 wherein said data processor determines an energy balance comprising the relative share of the total energy expended in closing said closure absorbed by individual components of a closure assembly including said closure, in a closing event, whereby distinguishing dynamic effects from static effects can be achieved.

19. A system according to claim 1 further including sensors measuring motion of said pivoted closure along a trajectory in at least two dimensions and generating corresponding data, said data processor analyzing said data to determine a door closing characteristic.

* * * * *

UNITED STATES PATENT AND TRADEMARK OFFICE
CERTIFICATE OF CORRECTION

| | | |
|---|---|---|
| PATENT NO. | : 7,747,410 B2 | Page 1 of 1 |
| APPLICATION NO. | : 11/973334 | |
| DATED | : June 29, 2010 | |
| INVENTOR(S) | : Van Esch | |

It is certified that error appears in the above-identified patent and that said Letters Patent is hereby corrected as shown below:

Col. 5, line 53, delete "alone" and insert -- along --.

Col. 8, line 17, delete "900" and insert -- 90° --.

Signed and Sealed this
Twenty-first Day of June, 2011

David J. Kappos
*Director of the United States Patent and Trademark Office*